United States Patent
Cahn

(10) Patent No.: US 7,570,588 B1
(45) Date of Patent: Aug. 4, 2009

(54) ALGORITHM FOR COMPUTING THE SIZE OF A VIRTUAL CIRCUIT (VC) GENERATING TOO MUCH RED TRAFFIC

(75) Inventor: Robert Cahn, Carmel, NY (US)

(73) Assignee: AT&T Corp., Bedminster, NJ (US)

( * ) Notice: Subject to any disclaimer, the term of this patent is extended or adjusted under 35 U.S.C. 154(b) by 469 days.

(21) Appl. No.: 11/451,958

(22) Filed: Jun. 13, 2006

Related U.S. Application Data

(63) Continuation of application No. 09/901,103, filed on Jul. 10, 2001, now Pat. No. 7,085,231.

(51) Int. Cl.
*H04L 12/26* (2006.01)
(52) U.S. Cl. .................. 370/232; 370/352
(58) Field of Classification Search .......... None
See application file for complete search history.

(56) References Cited

U.S. PATENT DOCUMENTS

| | | | |
|---|---|---|---|
| 5,343,465 A * | 8/1994 | Khalil .............. | 370/232 |
| 5,412,647 A | 5/1995 | Giroux et al. | |
| 5,446,733 A | 8/1995 | Tsuruoka | |
| 6,185,189 B1 | 2/2001 | Brassier et al. | |
| 6,201,793 B1 | 3/2001 | Chen et al. | |
| 6,370,116 B1 | 4/2002 | Giroux et al. | |
| 6,473,430 B2 | 10/2002 | Sreedharan et al. | |
| 6,505,244 B1 | 1/2003 | Natarajan et al. | |
| 6,631,119 B1 | 10/2003 | Mawhinney et al. | |
| 6,697,369 B1 * | 2/2004 | Dziong et al. .......... | 370/395.2 |
| 6,912,575 B1 * | 6/2005 | Swift et al. .............. | 709/226 |
| 2002/0018473 A1 | 2/2002 | Hassell et al. | |
| 2003/0212817 A1 | 11/2003 | Matthews et al. | |
| 2005/0265253 A1* | 12/2005 | Swift et al. .............. | 370/252 |

* cited by examiner

*Primary Examiner*—Jayanti K Patel
*Assistant Examiner*—Jung Park
(74) *Attorney, Agent, or Firm*—Banner & Witcoff, Ltd.

(57) ABSTRACT

A method is provided for computing the size of a virtual circuit that places excessive traffic into a network. An illustrative method adjusts a committed information rate of traffic for a virtual circuit in a telecommunication network and can include downloading statistical data for network switches found on a website, identifying virtual circuits that make excessive use of the network, and adjusting the committed information rate of traffic to form a modified committed information rate of traffic.

27 Claims, 5 Drawing Sheets

ALGORITHM FOR COMPUTING THE SIZE OF A VIRTUAL CIRCUIT (VC) GENERATING TOO MUCH RED TRAFFIC

This application is a continuation of, and claims priority to, co-pending U.S. application Ser. No. 09/901,103 filed Jul. 10, 2001. The prior application is hereby incorporated by reference in its entirety.

FIELD OF THE INVENTION

The present invention relates to a method for computing a committed information rate for a virtual circuit generating excessive traffic on a network.

BACKGROUND OF THE INVENTION

The efficiency of resource allocation and the quality of service provided by packet switching networks depends upon effective traffic engineering. Over the years, switched circuit network traffic engineering has become a well known art comprising the steps of measuring traffic over switched circuits in the form of conversation seconds and numbers of calls over periods of time, applying the results to certain probabilistically determined tables, and then installing appropriate facilitates and resources in the switched circuit network to match the measured and expected demand.

Estimating the expected demand, however, is made more difficult when bandwidth is provisioned by Virtual Circuits (VCs) rather than by physical circuits. This is because it is possible for VCs to throw more traffic into the network than what was contracted for with the users. The contracted rate between a user and a frame relay service provider is known as the Committed Information Rate (CIR). The CIR is the level of data traffic that the carrier agrees to handle over a period of time measured in bits per second. Typically, a user identifies to the frame relay provider the particular sites that the user wants to interconnect. Between each of these sites and based on agreement with the frame relay service provider, a Permanent Virtual Circuit (PVC) is established. For each PVC, a path is established across which all data will flow between those sites. The path may be defined when the PVC is added to the network, or computed by the network using a routing algorithm may determine the path. All frames transmitted between the identified sites follow the same PVC path, ensuring that the frames will not arrive out of sequence.

The CIR can be anywhere between 0% and 100% of the speed of the access line and the speed of the port on the device. The offered load to the network can burst above the CIR for a measured period of time. Bust levels are measured as Committed Burst Size, $B_c$, and Excess Burst Size, $B_e$. $B_c$ is the maximum amount of data per second, measured in bits that the carrier agrees to transfer under normal circumstances. $B_e$ is the maximum amount of additional data measure in bits that the carrier will attempt to handle, assuming that congestion conditions in the network permit. Indication of whether the data on the network from the PVCs exceed the $B_c$ or the $B_e$ values is designated at the ingress switch where the traffic enters the network and is used by the switches along the path which carry many VCs on a common backbone.

In ATM switches, the excess frames at the $B_e$ level are designated as Discard Eligible, (DE) when converted from frames to cells. Through a mechanism known as the Graceful Discard, (GD), the DE cells are forwarded into the network and are discarded, when necessary, by the carrier somewhere in the network during periods of congestion. If the network is not congested, the carrier will deliver the excess frames and bits. For example, one can burst above the CIR to the level of $B_c$ with reasonable assurance that the data will get to the destination site. One can burst above the $B_c$ level, although all bits in the $B_e$ area are subject to being designated DE. The DE bits are discarded in the event that the network is congested and the buffers in the network switches and router overflow. Additionally, one can also transmit above the total of the $B_c+B_e$ level, but those bits in those frames may be discarded at a switch along the path.

In Frame switches, all traffic up to the CIR is conforming and is designated as "green". Traffic from the $B_c$ level up to the $B_c+B_e$ level is designated as "amber", and any subsequent traffic above $B_c+B_e$, is designated as "red". During periods of congestion, the switch first discards red designated data, then amber designated data, and finally green designated data. If the network is not congested, the carrier will deliver the excess data bits. Any bits designated red, above the $B_c+B_e$ level, will be discarded first. Next, if the congestion grows more severe then the amber frames will be discarded. Finally, the green frames will only be discarded if the congestion becomes very severe.

With the number of PVCs on the various networks, the increase in PVC utilization above the contracted rate can lead to a number of difficulties. Specifically, users who place excess traffic on the network can have a negative impact on the performance of users who do not place excessive traffic on the network. Additionally, PVCs with excess traffic can easily become problem PVCs with poor performance. Therefore, it is important that PVCs adhere to their contracted rate to avoid network traffic congestion.

Unfortunately, it has become apparent that a number of the PVCs on various networks are using more than their allotted portion of network resources. While carriers should support the ability of customers to burst to the access rate, there comes a time when PVC utilization is excessive. Consequently, it would be advantageous to identify PVCs that make excessive use of the network and estimate a new CIR for each of those circuits. This will provide fairness among all PVC circuits connected to the network and will provide accurate information for network traffic engineering estimations.

Therefore, there exists a need in the art for a method of calculating a new CIR for a PVC when the traffic has grown to a point that exceeds the contracted capacity of the PVC.

BRIEF SUMMARY OF THE INVENTION

In order to provide an improved network, it is desirable for service providers to identify PVCs that make excessive use of network resources. Once identified service providers can calculate new committed information rates for the PVCs that are excessively using network resources. The new committed information rates will improve network performance for all users.

According to one aspect, the present invention provides a method of identifying virtual circuits that make excessive use a network. In a further aspect, the present invention provides a method of adjusting a contracted rate of traffic in a telecommunication network for a virtual circuit making excessive use of a network. In yet another aspect, the contracted rate of traffic is adjusted in a method comprising the steps of downloading statistical data for network switches found on a website, identifying the virtual circuits that make excessive use of the network, and adjusting the contracted rate of traffic to form a modified contracted rate of traffic.

The full range of advantages and features of the invention are only appreciated by a full reading of this specification, and a full understanding of the invention. Therefore, to complete this specification, a detailed description of the invention follows, after a brief description of the drawings wherein additional advantages and features of the invention are disclosed.

BRIEF DESCRIPTION OF THE DRAWINGS

The invention will be described in the following description with reference to the following figures wherein.

DETAILED DESCRIPTION OF THE INVENTION

Figure 1A:
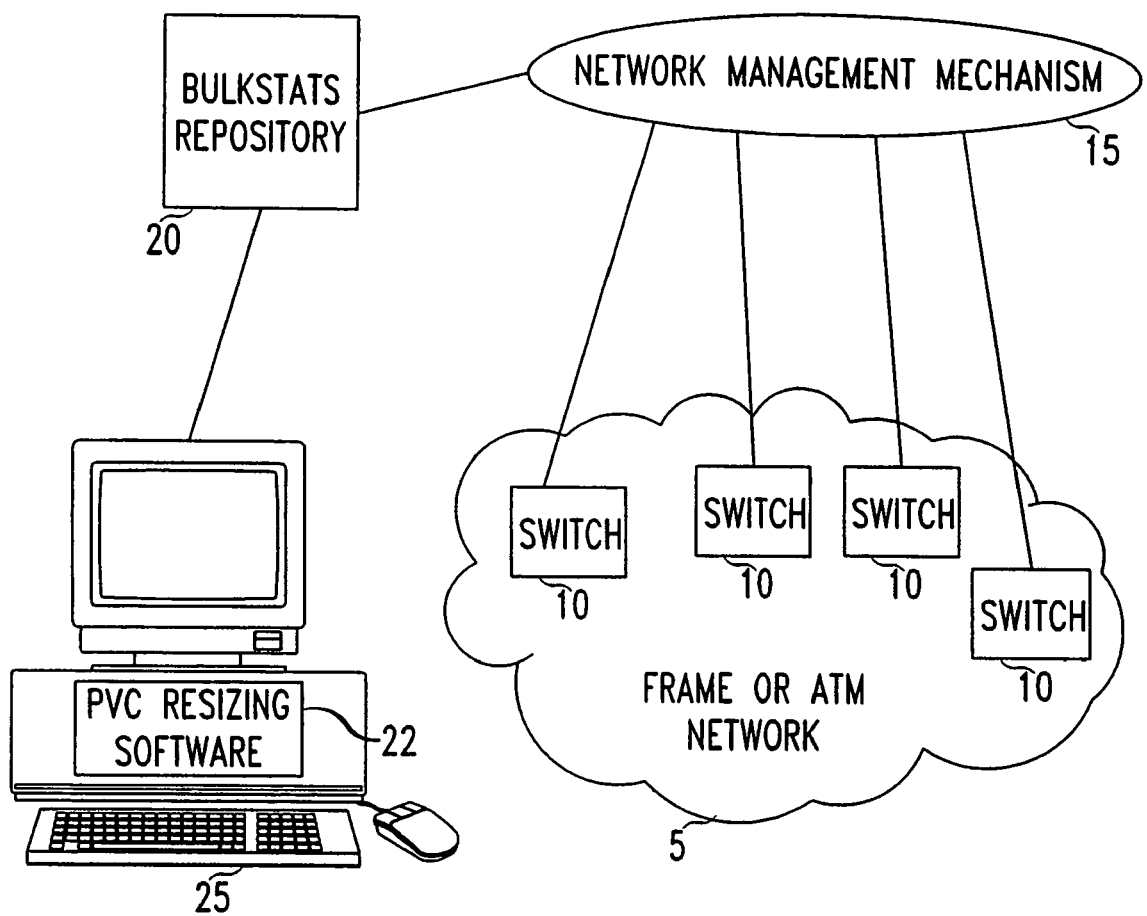
FIG. 1a shows the network architecture for the collection of network data for the adjusting of the committed information rate of a virtual circuit according to an exemplary embodiment of the present invention.

FIG. 1a shows an illustrative network architecture for the collection of network data incorporating aspects of the present invention. As shown in FIG. 1a, a Frame or ATM network, 5, includes a number of network switches 10 that direct data according to the destination address of the data.

Constantly monitoring the state of the network is the Network Management Network, 15. The Network Management Network, 15, collects switch statistics at predetermined time intervals. Statistics retrieved from network switches are called bulkstats. As shown in FIG. 1a, a bulkstats repository 20 found on the Internet, for example, collects statistics from the Network Management (NM) Mechanism 15. In one embodiment of the present invention, the bulkstats repository 20 may be a data housing website that stores network switch statistics.

A computer, 25, storing in memory a PVC resizing algorithm, 22, can access the data housing website, i.e., bulkstats repository 20, from the Internet, a Wide Area Network (WAN), an internal network or other networks used to connect computers, and adjust the committed information rate (CIR) of a virtual circuit if it is necessary.

Figure 1B:
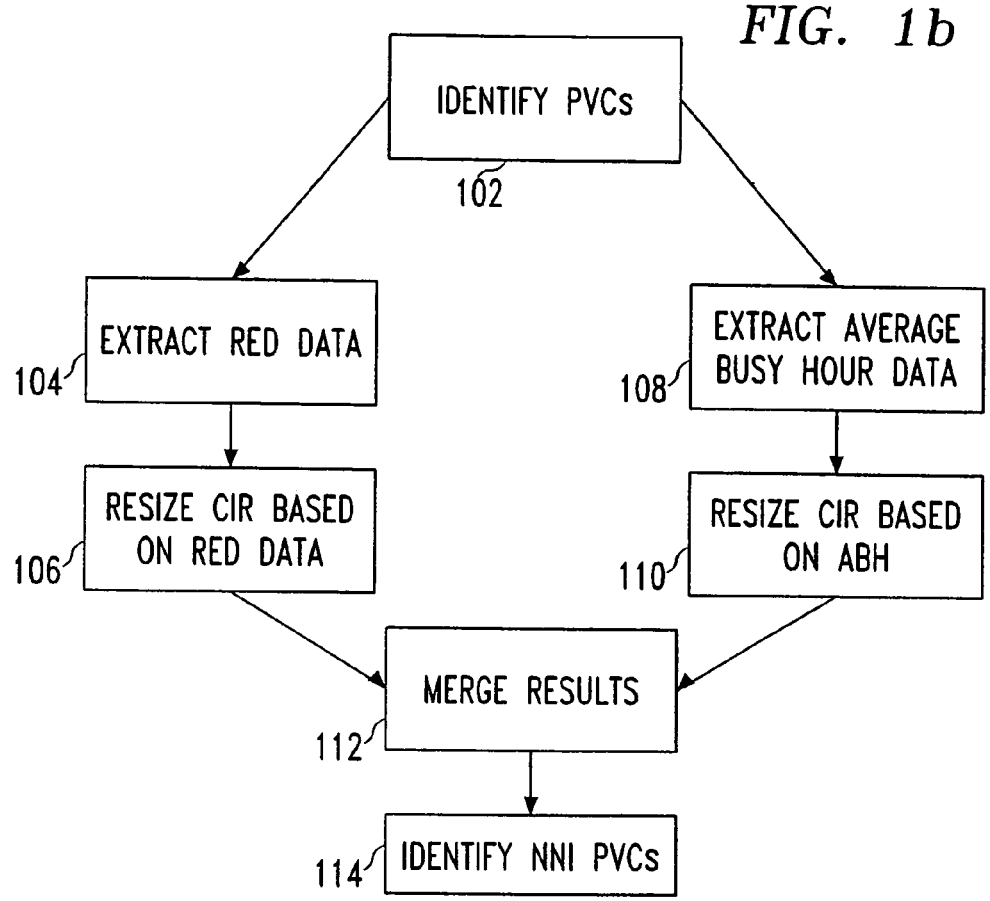
FIG. 1b shows a block diagram illustrating the steps for adjusting the committed information rate for a virtual circuit generating excessive traffic on a network according to an exemplary embodiment of the present invention.

FIG. 1b shows a method of adjusting a contracted rate of traffic in a telecommunication network for a PVC, in accordance with an illustrative embodiment of the invention. A telecommunications network encompasses any network for routing or switchably routing packets of data comprising fixed or variable numbers of variant data. Some examples include the Internet, local packet data networks, wide area networks, asynchronous transfer mode networks, frame relay networks, and hybrid networks. In the described example, the telecommunications network comprises a frame relay network, although the principles of the present invention may be applied to any telecommunications network. FIG. 1b shows two criteria represented as parallel paths that can be performed to identify PVCs that are making excessive use of a network. One skilled in the art will appreciate that several additional or alternative formulations may be utilized to determine whether a PVC is generating excessive traffic.

The first criterion identifies PVCs with excessively bursty traffic behavior. The criterion determines if the more than 20% of the sample threshold during the business week exceeds 25% of the red threshold, traffic above the $B_c+B_e$ level, for a period of three consecutive months. One skilled in the art will appreciate that other alternative percentages may be used to determine bursty traffic behavior. The percentages chosen were considered fair and reasonable to both users and service providers. Similarly, the chosen time period of three consecutive months was a balance between satisfying a users temporary need to use network resources excessively and the need to protect against negative performance of a network due to a users long-term excessive traffic injections. One skilled in the art will appreciate that different time periods other than three consecutive months could be utilized.

Figure 2:
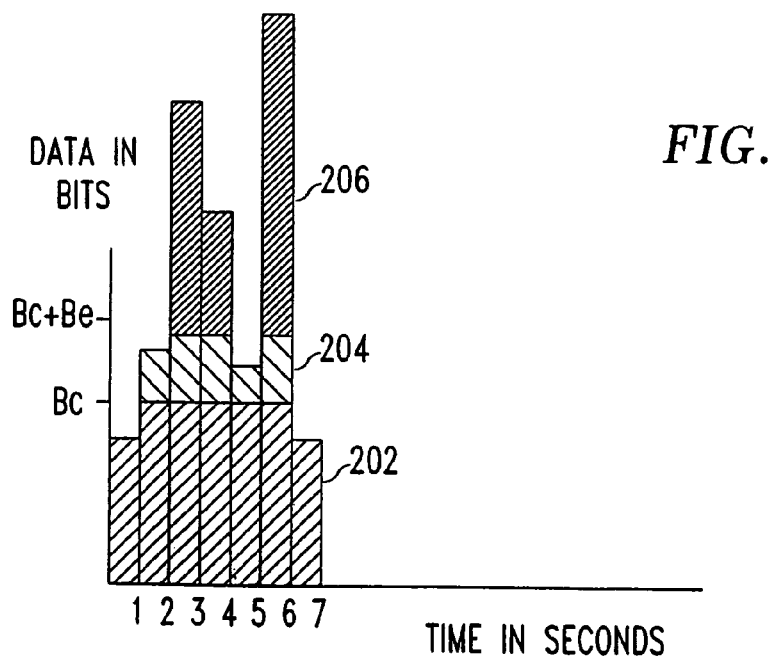
FIG. 2 is a bar graph illustrating the designating of data in a frame switch.

The red threshold identified in the first criterion, refers to frame switches that use counters to decide the color designation of a frame. FIG. 2 shows the color designating of data in a frame switch during a seven second time period. As indicated, the data up to the $B_c$ level, 202, is designated as green. The data traffic is designated as amber, 204, from the $B_c$ level up to the $B_c+B_e$ level, and the data traffic that exceeds the $B_c+B_e$ traffic level, 206, is designated as red.

The second criterion is the Average Busy Hour (ABH) condition, which catches PVCs that constantly pump data into a network at an excessive rate. The criterion determines if the ABH utilization exceeds 100% of CIR during the business week for three full months. The criterion therefore identifies PVCs that for over an average of 21 days per month for three consecutive months exceed the CIR, on average, for 3600 consecutive seconds. The criterion is one that operates on a longer time frame to determine if PVC utilization is excessive. Just as in the case of criterion 1, one skilled in the art will appreciate that different time periods other than three consecutive months could be utilized.

The first and second criteria are calculated separately and the larger of the still to be calculated new CIR values, if any, is used as the adjusted CIR value. The details of both criteria are discussed in the various steps of FIG. 1b detailed below.

In step 102, a file for each network of interest can be obtained that identifies the PVCs on that network for an identified time period. For example, if one is interested in the PVC data for three months on the network denoted as AFN, then three separate text files of data, one for each month, could be downloaded from a network data housing website.

For practical reasons, in one embodiment, both the Average Busy Hour and the excessively bursty traffic criteria are driven off of data that is automatically collected from the networks. A program to download the data on some scheduled basis from a website may be employed to prevent having to download each file individually. In addition, the data could be combined into one file in order to make the data more manageable. For example, the information could be downloaded monthly and combined into a single output file. In another exemplary embodiment, the information could be downloaded on a quarterly basis. One skilled in the art will appreciate that the download frequency can be changed depending upon the particular criteria. In addition, the development of software that performs the function of downloading data from a website is well within the skill of a practitioner in the art and is therefore not discussed here.

Bulkstats are collected every 15 minutes from all the switches in the frame network. If there are no operational problems, each PVC on the frame network will have 96 samples per day or approximately 3000 samples per month. Bulkstats are available for downloading on network data housing websites. Statistics per PVC are available for the average busy hour, forward and backward, per week or weekdays. In addition, statistics are available for the maximum busy hour, forward or backward, per week or weekdays. Other illustrative data that may be available include Frame Rates in frames per second, the amount of data carried through the switch, the amount of data dropped and the amount of data discarded.

In step 104, a program extracts summary red frame information for the PVCs identified in the output file of step 102. The summary red frame information files may also be available from network data housing websites for the network and time period of interest. A file for each month of interest can be downloaded and red information for each PVC extracted. For example, if one is interested in the red frame information for three months on the AFN system, three separate files of data, one for each month, could be downloaded from a network data housing website. A program to download the data on some scheduled basis from a website may be employed to prevent having to download each file individually.

The excessive traffic represents traffic above the $B_c+B_e$ level, and is designated as red in frame switches. In ATM switches, the excessive traffic above the $B_c+B_e$ level is designated as Discard Eligible. If the amount of bursty traffic exceeds a threshold, the CIR of the VC should be increased. Unlike traffic that exceeds the average busy hour constraint there is not a clear relationship between the amount of bursty traffic after the CIR has been increased, and before. A simple example will show why.

For illustrative purposes, a simplification can be made by setting $B_c=B_c+B_e$ and $B_e=0$. Therefore, the frame switches will identify only green and red traffic. For the following example, assume that the CIR is 16 Kbps. Further, assume that the traffic profile shows that 1 out of every 5 second bursts at 64 kilobits and the other 4 seconds shows no traffic. This traffic pattern corresponds to an average utilization of 12.8 Kbps. This traffic pattern can be denoted as $T_1$. Similarly, assume there is a traffic pattern $T_2$ where 2 seconds of traffic is 32 Kbps, 50% red, and the other 3 seconds shows no traffic entering the VC. Over the long term the average red traffic entering the network with these two traffic patterns is different even though the utilization is equal. But, if the CIR is raised to 32 Kbps then all the red traffic generated by $T_2$ becomes within the contracted range, 0% red, whereas only part of the red traffic in the $T_1$ traffic pattern becomes green.

Figure 3A:
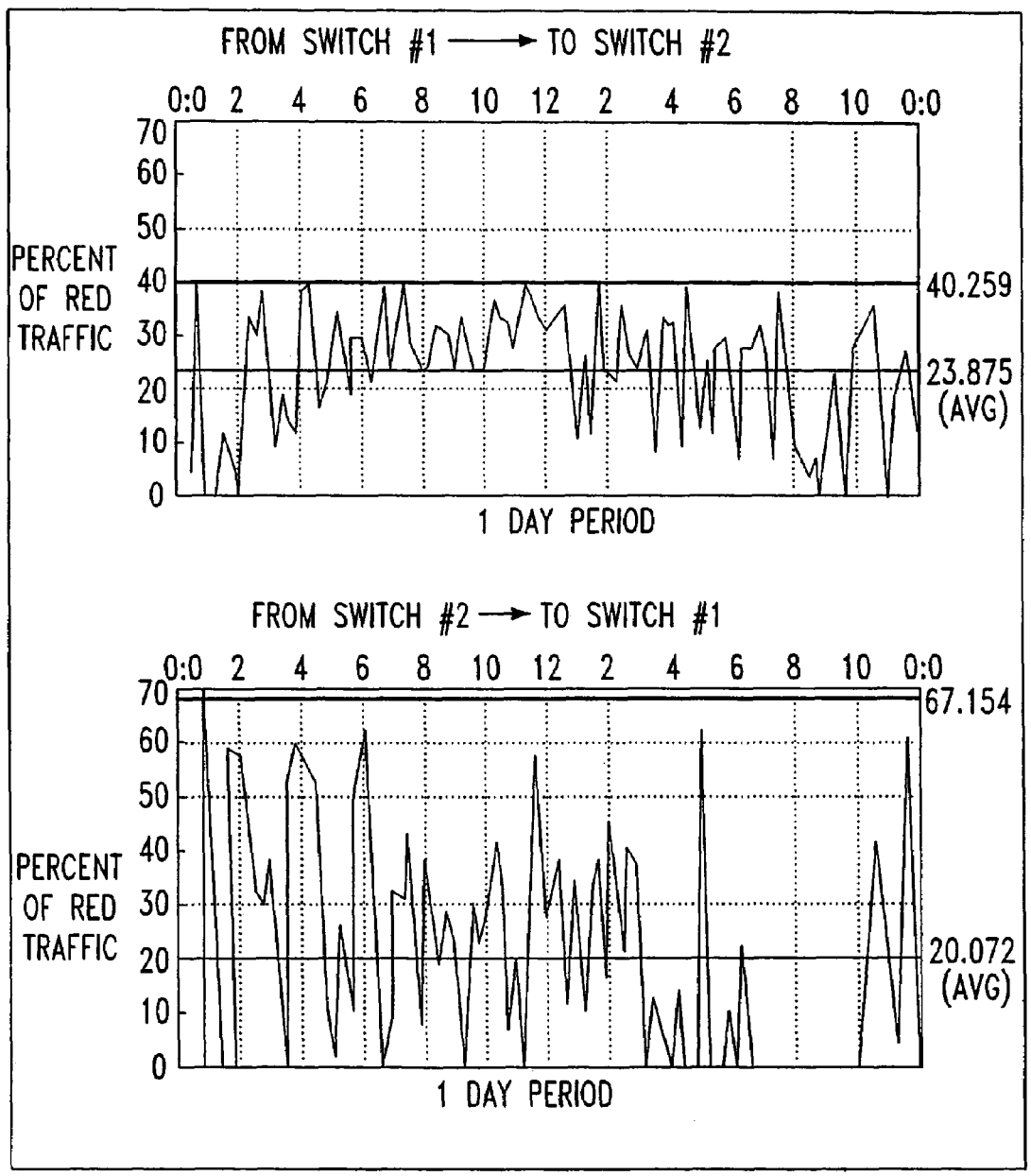
FIG. 3a shows an illustrative plot of the percentage of red traffic from a PVC versus time.

In real frame switches, such as those made by Lucent Technologies, the data per VC is gathered in 15-minute periods, and data may be represented as shown in FIG. 3a. FIG. 3a shows a trace of the traffic of a PVC between two switches on a network over a period of a day. The PVC illustrated in FIG. 3a is sending too much red traffic into the network. This is expressed by setting a threshold $R_1$, called the red threshold, and counting the number of data points, m in the n samples where the percentage of red traffic exceeds $R_1$. If $$m/n > R_2$$

for a second threshold $R_2$, called the sample threshold, the VC will be designated as an offender for sending too much red traffic into the network. An example is shown in FIG. 3b.

Figure 3B:
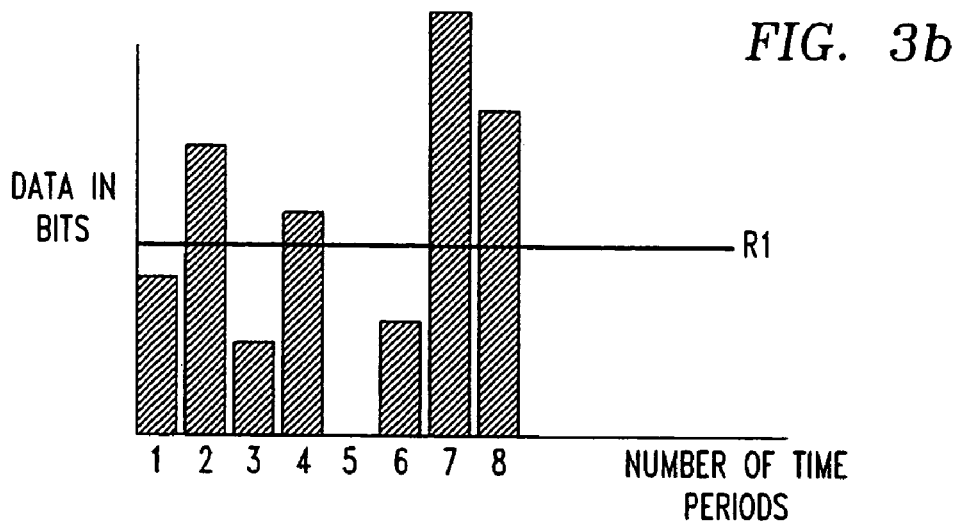
FIG. 3b illustrates data from a PVC exceeding a threshold value over a time period.

In FIG. 3b, eight time periods of data in bites are represented. Notice that there is no data for time period five. The missing data represents a failure to collect or process the data. The failure to collect or process data might occur when the switch is busy or the connection to the network data housing website failed to establish. In this example, n is equal to seven and m is equal to four because the threshold R1 is exceeded in time periods 2, 4, 7 and 8. Thus m/n is equal to $4/7$.

The advantage of this double threshold system is that it is extremely easy to determine the list of offending virtual circuits. It is also simple to explain to the network user why the VC is offending. The red traffic simply is a measure of how much the VC is bursting above the agreed upon contract. It is possible for VCs to violate the double threshold constraint even at very low utilization. Indeed, if one looks at the utilization of the VC for the same time period as shown in FIG. 3a, it is discovered that the VC is bounded by 71% with the average being only 11%.

In step 106, a program processes the PVCs for frame resizing. When a PVC exceeds the double threshold, the CIR can be increased with the expectation that the resized PVC will stay within the red frame limits if the traffic does not increase or change. This presents a problem because the data captured by the frame switches in the network is not captured on a second by second basis but rather as 15-minute averages. Because the traffic distribution in smaller increments is not known, the resizing of the PVC's CIR could be affected. For example, assume that the amount of red traffic observed during a measurement period is 5,000,000 bits. Remember that the measurement period is relatively long compared to the refresh period on the traffic-marking timer. If the measurement period is 15 minutes, or 900 seconds, then one knows that the average amount of red traffic is 5555 bits per second. Suppose that one wants to lower the amount of red traffic to 2,000,000 bits. Then if the traffic consists of alternates between multisecond bursts of 32 Kbps and 0 Kbps then one can achieve this reduction by raising the CIR by far less than if the traffic alternates between multisecond bursts of 64 Kbps and 0 Kbps. If switch vendors captured the fine detail of the red designating process by storing the actual number of bits designated red in each second, then the calculation could be made with greater accuracy.

However, assumptions about the traffic distribution when measured on a second-by-second basis can be made to resolve this dilemma. Two alternative embodiments of recalculating the CIR are presented, a discrete and a continuous probability model for calculation a new CIR value. Both the discrete and continuous embodiments yield acceptable results.

In the discrete model embodiment, it is assumed that each second the traffic falls within one of k different traffic profiles. As an example, assume that k=3. Further, assume that during a period, P, the traffic was 25% red and that traffic over 10 Kbps is designated red. Further assume that during each second the traffic is either 10 Kbps with p=⅓, 13.333 Kbps with p=⅓, or 16.666 Kbps with p=⅓.

It is clear that the first traffic pattern is designated all green. The second traffic pattern is designated ¾ green and ¼ red. The final traffic pattern is designated ⅗ green and ⅖ red. An entire collection period of 15 minutes represents 900 such samples. This is more than enough time for the central limit theorem to apply.

If one wishes to reduce the traffic to 20% red, this is accomplished by raising the red designating boundary from 10 Kbps to a value C. Computing C is simple algebra. First, one knows that 10, 000<C<16, 666.

The green traffic is 10,000+min(C, 13, 333)+C

The red traffic is

0+max(0, 13, 333−C)+16, 666−C

If 4×red=green then one solves by first assuming 10,000≦C≦13, 333. The equation then becomes 10,000+2×C=4×(29, 999−2×C)

or C=11, 000 bps.

It is interesting to note that this formulation works even if the utilization is very low. Instead of all the probabilities being set to ⅓, one might set them all to ¹⁄₁₀ and set the probability of no traffic during the measurement period to ⁷⁄₁₀. Then the traffic is burstier but the ratio of red traffic to green traffic is maintained though the average utilization during a longer period is now far lower.

Figure 4:
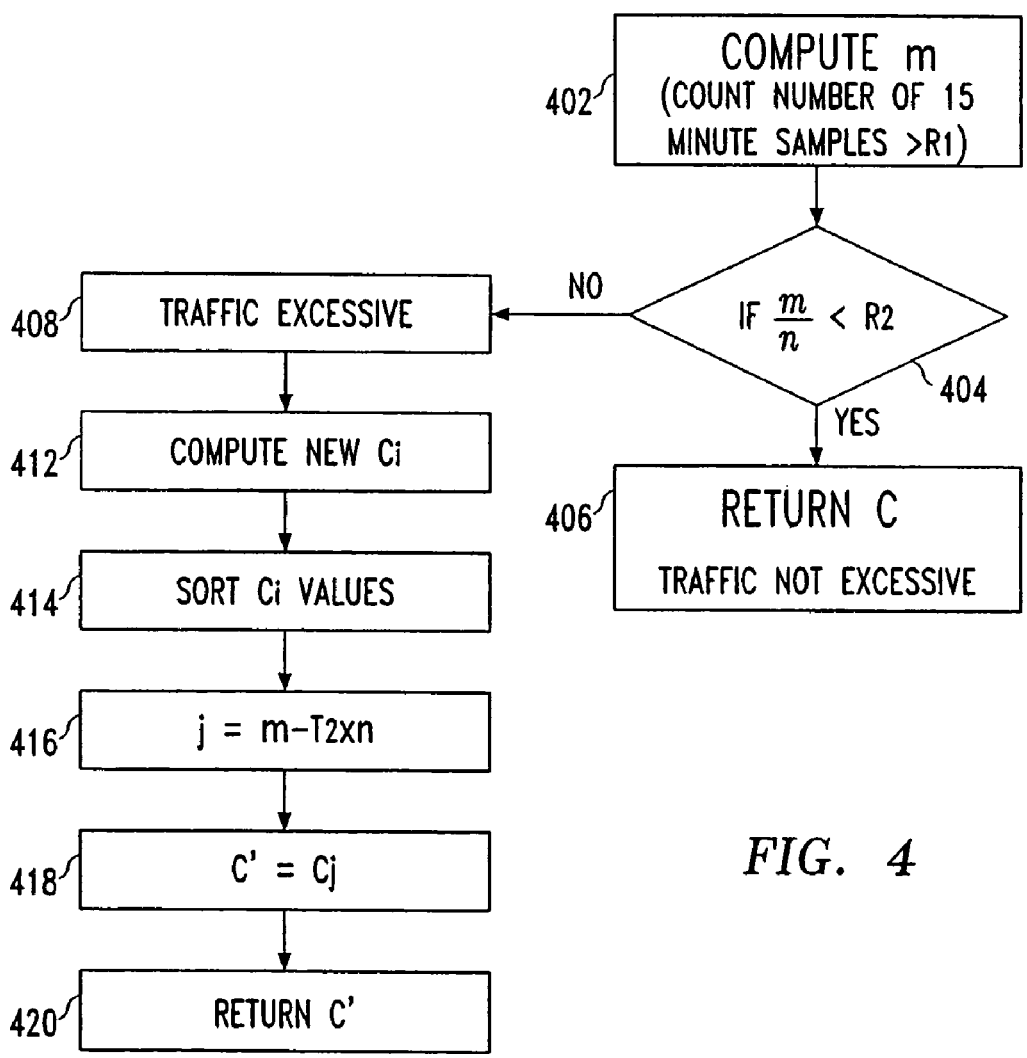
FIG. 4 is a block diagram illustrating how a discrete probability model may be used to adjust the value of a committed information rate for a virtual circuit generating excessive traffic on a network according to an exemplary embodiment of the present invention.

The block diagram of FIG. 4 illustrates how a discrete probability model could be used in an algorithm to adjust the value of a committed information rate for a virtual circuit generating excessive traffic on a network. The program would assume the following inputs:

A set of n samples, $S_i$ of red and green traffic on a VC with CIR of C.

A pair of thresholds $R_1$ and $R_2$.

A pair of target thresholds $T_1$ and $T_2$ with $T_1<R_1$ and $T_2<R_2$.

In step 402, the algorithm makes a pass thorough the list of all the PVCs and computes m, the number of samples exceeding threshold value $R_1$. Next in step 404, if $$\frac{m}{n} < R_2$$

then the program returns the current value of C because the traffic from the PVC is not excessive, step 406. If in step 404, $$\frac{m}{n} \geq R_2,$$

then the data traffic is excessive, step 408. For each sample, $S_i$, having red traffic over the threshold $R_1$, compute the new capacity $C_i$, step 412, such that the estimated amount of red traffic is below $T_1$. Next, sort the m values $C_i$, step 414, in increasing order and let j=m−$T_2$×n, step 416. Finally, set C'=$C_j$, step 418, and return C', step 420.

As an example, assume that one has taken 5 measurement periods, $M_1 \ldots M_5$. Further assume that the percentage of red traffic in each period is as follows 30%, 40%, 20%, 25%, 50% and that the original C=10 Kbps. Proceeding as above, one calculates that the bandwidth for each interval is 13 Kbps, 14.5 Kbps, 11 Kbps, 11.5 Kbps, and 16 Kbps. Next, as in step 414 the values are sorted in increasing order. The increasing order is 11 Kbps, 11.5 Kbps, 13 Kbps, 14.5 Kbps, and 16 Kbps. In step 416, one lets j=m−$T_2$×n. Assuming that one wants less that 20% of the samples to exceed the threshold, then C'=$C_j$, where C'=14.5 Kbps.

In another embodiment, the discrete probability distribution can be replaced with a continuous distribution to calculate C'. Again one assumes 25% red traffic and a CIR of C=10 Kbps. Assume that one picks a value L with L<C. Further, assume that during the seconds when the VC carries traffic, the traffic is uniformly distributed in an interval [L, U] with U>C. Clearly the choice of U determines the percentage of red traffic. The total traffic is $$\int_L^U x\,dx = \frac{U^2 - L^2}{2}$$

The amount of red traffic is $$\int_C^U (x-C)\,dx = \int_0^{U-C} y\,dy = \frac{(U-C)^2}{2}$$

Therefore, U is determined by the equation $$\frac{(U-C)^2}{2} = \frac{1}{4}\frac{U^2 - L^2}{2}$$

As an aside note that if U>AR, the access rate, then L will be disallowed and required to be larger. Also note that if the amount of red traffic had been 40% then U would have been defined by $$\frac{(U-C)^2}{2} = \frac{4}{10}\frac{U^2 - L^2}{2}$$

Every sample value will produce a different value of U. If one wants to compute the value of C' such that the red traffic is below $T_1$, one solves $$\frac{(U-C')^2}{2} = T_1 \frac{U^2 - L^2}{2}$$

with C'>C. As an example, suppose that one has a PVC of 16 Kbps with an access rate of 64 Kbps. Further assume that the traffic is 30% red. By observing the utilization of the circuit one sees that it varies between 12 Kbps and 48 Kbps. If one then uses U=48, L=12 and $T_1$=0.2, one finds that C'=U−$\sqrt{T_1(U^2-L^2)}$ or 27.2 Kbps.

Figure 5:
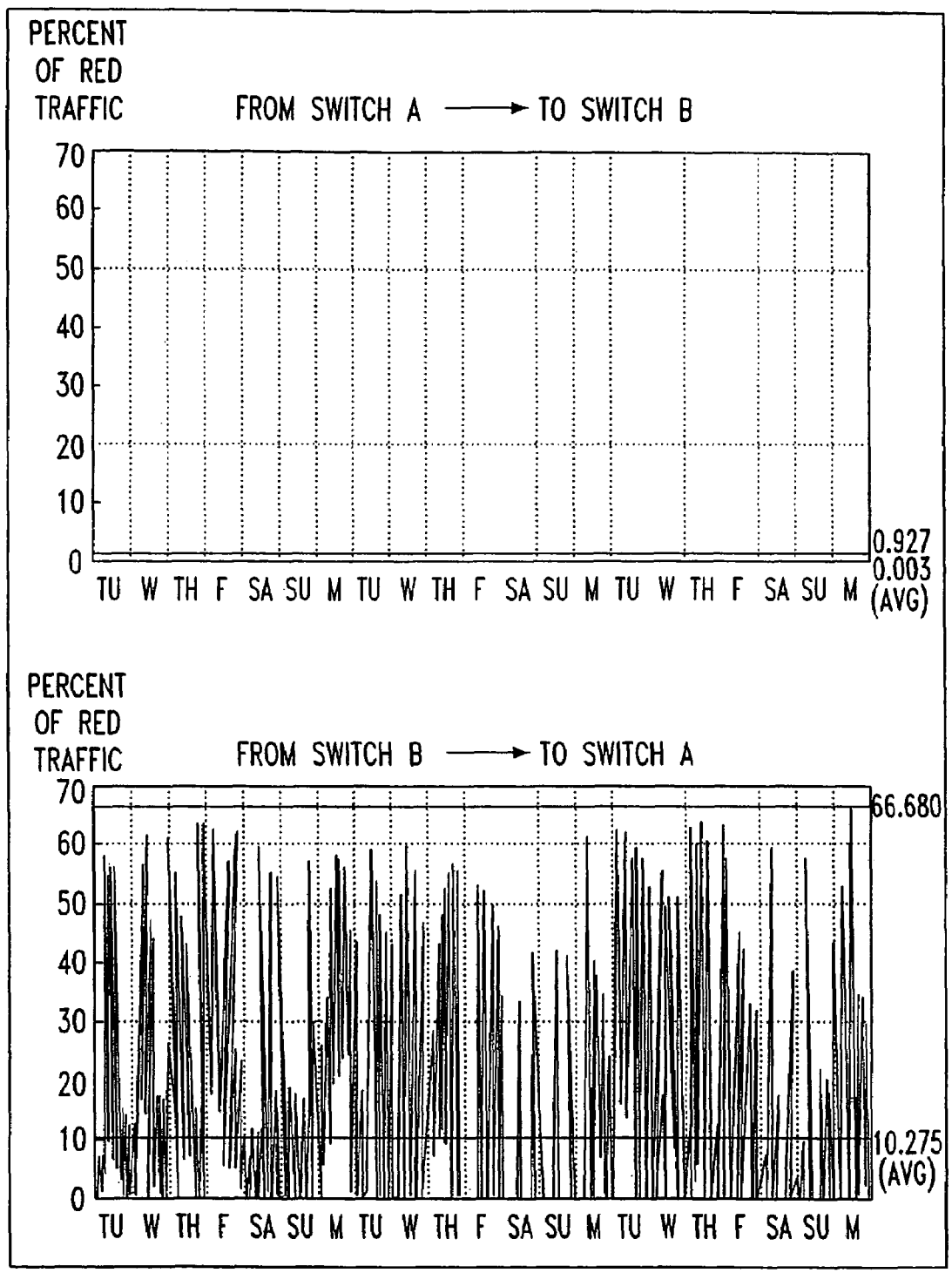
FIG. 5 shows an illustrative plot of a PVC that has a great deal of red traffic.

In FIG. 5, a PVC is shown that has a great deal of red traffic in one direction. If the red threshold is 25% and the sample threshold of 20% then 22.15% of the samples exceed the threshold though it is clear that many exceed it by a considerable amount.

If one applies the continuous algorithm to this PVC with different target thresholds one can see the sensitivity of the algorithm to these thresholds. The results are found in Table 1 below.

TABLE 1

New CR for Different Targets.

|  | ST = 19% | 18% | 17% | 16% | 15% | 14% | 13% | 12% | 11% | 10% |
|---|---|---|---|---|---|---|---|---|---|---|
| RT = 24% | 72.20 | 74.52 | 77.78 | 82.77 | 87.21 | 92.95 | 98.62 | 108.73 | 116.02 | 125.05 |
| 23% | 75.54 | 77.95 | 81.35 | 86.55 | 91.17 | 97.16 | 103.06 | 113.60 | 121.19 | 130.60 |
| 22% | 79.10 | 81.61 | 85.16 | 90.58 | 95.41 | 101.65 | 107.80 | 118.79 | 126.71 | 136.52 |
| 21% | 82.91 | 85.54 | 89.24 | 94.90 | 99.94 | 106.45 | 112.88 | 124.35 | 132.62 | 142.86 |
| 20% | 87.00 | 89.75 | 93.62 | 99.54 | 104.81 | 111.62 | 118.34 | 130.33 | 138.96 | 149.67 |
| 19% | 91.41 | 94.29 | 98.34 | 104.54 | 110.06 | 117.18 | 124.22 | 136.77 | 145.80 | 157.01 |
| 18% | 96.19 | 99.21 | 103.46 | 109.96 | 115.74 | 123.21 | 130.58 | 143.74 | 153.21 | 164.95 |

ST = Sample Threshold, RT = Red Threshold

As this table makes clear the new CIR, increases both the target red threshold and the target sample threshold decreased although in this case the increase is more determined by the target red threshold than the target sample threshold. If one uses the algorithm to resize this PVC based on the assumption that 15% of the samples will be less than 20% red then the CIR will be increased to 105 Kbps from 64 Kbps.

It is interesting to see the effect of the different values of L on the calculation of the new CIR. For the PVC used in this section the results for different values of L are shown in Table 2 below. As one will note the effect is minor.

TABLE 2

Effect of different choices of L

|  | ST = 19% | 18% | 17% | 16% | 15% | 14% | 13% | 12% | 11% | 10% |
|---|---|---|---|---|---|---|---|---|---|---|
| RT = 20% L = 1 | 87.00 | 89.75 | 93.62 | 99.54 | 104.81 | 111.62 | 118.34 | 130.33 | 138.96 | 149.67 |
| RT = 20% L = 0.75 | 86.10 | 88.74 | 92.45 | 98.14 | 103.20 | 109.75 | 116.22 | 127.77 | 136.09 | 146.43 |
| RT = 20% L = 0.5 | 85.38 | 87.94 | 91.54 | 97.05 | 101.95 | 108.29 | 114.56 | 125.77 | 133.86 | 143.91 |

The algorithm uses a lot of data to make the calculations. For example, for a month of data restricted to the business week, the number of samples gathered is about 2100. If one is looking at analyzing hundreds of VCs the amount of data could get quickly out of hand.

However, one can summarize the data into ranges fairly easily. The 2100 samples might be summarized as in Table 3 below.

TABLE 3

| min red | max red | Number of Samples |
|---|---|---|
| 0 | 0 | 930 |
| 0.01 | 0.04 | 120 |
| 0.05 | 0.09 | 80 |
| 0.10 | 0.14 | 65 |
| 0.15 | 0.19 | 90 |
| 0.20 | 0.24 | 110 |
| 0.25 | 0.29 | 130 |
| 0.25 | 0.29 | 180 |
| 0.25 | 0.29 | 190 |
| 0.30 | 0.34 | 115 |
| 0.35 | 0.39 | 15 |
| 0.40 | 0.44 | 5 |

One can then compute $C_j$ for all the samples in a range or, optionally, spread them evenly throughout the range. In either case, the amount of data per VC is dramatically reduced.

If one does this for the VC shown in FIG. 5 one can get a feeling for the sensitivity of the calculation to this summarization. The results are shown in Table 4 below.

TABLE 4

| bucket size | computed CIR |
|---|---|
| exact | 104.81 |
| 1% | 105.18 |
| 1.5% | 106.19 |
| 2% | 107.21 |
| 2.5% | 104.17 |
| 3% | 109.27 |
| 4% | 103.17 |

TABLE 4-continued

| bucket size | computed CIR |
|---|---|
| 5% | 109.27 |
| 6% | 115.60 |
| 8% | 95.36 |
| 10% | 99.22 |

Both the discrete and continuous methods rely on a simple model of the second-by-second flow through a VC and can be improved in accuracy if data is actually gathered from production on a more frequent basis. In the absence of such data, both models produce a reasonable estimate for an adjusted CIR. By monitoring the predicted behavior with respect to the thresholds T1 and T2 they can be tuned even without second-by-second data gathering. The data can be summarized into perhaps 10 to 20 ranges and reasonable estimated made.

Next, the second criterion, the Average Busy Hour (ABH) condition is examined. On a parallel track to that of the extraction of red data, in step 108, a program extracts ABH data for the PVCs identified in the output file of step 102. The ABH data files can be found on a network data housing website, not shown, or in a bulkstats repository in either weekly or weekday format. For this embodiment, weekday statistics are used. A file for each week over the 3 month time period must be downloaded. For example, if one is interested in the information for the AFN system then 16 weekly files will need to be downloaded from the website. A program to download the data on some scheduled basis from a network data housing website could be written to prevent having to download each file individually.

In step 110, a program processes the PVCs for busy hour resizing. The optimized value of a PVC is a value that minimizes the bandwidth consumed for the PVC, while guaranteeing the same service for the PVC. In order to accomplish, the CIR must be large enough to minimize the frames tagging.

Several formulas have been tried to compute from the ABH or Maximum busy hour (MBH) the optimized value of a PVC. The 15-minute values are averaged on an hourly interval every day, to produce 24 averaged hourly values per PVC. The maximum of these 24 values is named the day busy hour. The Maximum busy hour (MBH) of a PVC on a given week is the maximum of the day busy hour for all the days of the week (or weekday). The ABH of a PVC on a given week is the average of the day busy hours for all the days of the week (or weekday).

While the MBH is more conservative, it does not reflect the steady state behavior of a PVC. Therefore, the optimizing computation is based on the ABH instead of the MBH. Contingency is taken on top of the ABH to ensure that in most of the cases, the traffic will be delivered without tagging.

The equation recommended for the PVC is:

New_CIR=Max(mean(ABH)+2×ABH square deviation)

where mean (ABH) and square deviation are the average and square deviation of the weekly ABH values on the month studied, and the max represents the maximum value found on a several month period of monitoring.

In step 112, a program merges and compares the red frame resizing and the busy hour resizing values for the CIR. The program sets the new CIR to the larger of the two values computed in step 106 and 110. The program keeps track of the number of PVCs that could not be resized due to missing data. If too much data is missing, the PVC may not be resized. Finally, the program computes the total amount of CIR being added to the network. This is just a total of all the increased CIR. For example, if we have 1,000,000 Kbps of CIR and are adding 50,000 Kbps, then one would think of the network traffic as having grown by 5%.

In step 114, a program identifies PVCs ending at a Network Node Interface. If a PVC spans more one network like the AFN and the GFN then, because the two NMS report different data it is possible that the tools will recommend different upgrades. For example, it is possible for the statistics on the different sides of the Network Node Interface to look differently. If, on one AFN side the program recommends an increase from 16 Kbps to 24 Kbps and on the GFN side the program recommends an increase from 16 Kbps to 32 Kbps, then one would increase both networks to 32 Kbps.

The description of the apparatus of this invention is not intended to be limiting but is merely illustrative of the preferred embodiment of this invention. Those of ordinary skill in the art will recognize that modifications can be made to the calculations adjusting the value of the CIR described herein without departure from the true spirit and scope of the invention.

The true spirit and scope of the inventions of this specification are best defined by the appended claims, to be interpreted in light of the foregoing specification. Other apparatus which incorporate modifications or changes to that which has been described herein are equally included within the scope of the following claims and equivalents thereof. Therefore, to particularly point out and distinctly claim the subject matter regarded as the invention, the following claims conclude this specification.

I claim:

1. In a telecommunication network having a plurality of interconnected switches, a method of adjusting a committed information rate of traffic for a virtual circuit comprising the steps of:
    a) obtaining statistical data for the plurality of interconnected switches, wherein the statistical data relates to respective amounts of data that pass through the switches;
    b) identifying for each of the plurality of interconnected switches, virtual circuits that make excessive use of the network;
    c) adjusting the committed information rate of traffic to form a modified committed information rate of traffic, wherein a probability model is used to determine the modified committed information rate of traffic, wherein the probability model includes a discrete probability model; and
    d) computing a value for m, which represents a number of samples exceeding a first threshold value $R_1$; and
    e) if $$\frac{m}{n} \geq R_2,$$

where n represent a number of samples, then for each sample, $S_i$, having red traffic over the threshold $R_1$ computing a revised capacity $C_i$, such that an estimated amount of red traffic will be below a first target threshold, $T_1$.

2. The method of claim 1, wherein the telecommunication network comprises a frame relay network.

3. The method of claim 1, wherein the telecommunication network comprises an asynchronous transfer mode network.

4. The method of claim 1, wherein the virtual circuit comprises a permanent virtual circuit.

5. The method of claim 1, wherein the telecommunication network comprises a packet switched network.

6. The method of claim 1, wherein step a) includes downloading statistical data found on a website.

7. The method of claim 6, wherein the statistical data found on a website includes a predetermined number of months of the network statistical data.

8. The method of claim 7, wherein the predetermined number of months comprises three months.

9. The method of claim 1, wherein the statistical data comprises bulkstats.

10. The method of claim 1, further comprising the steps of:
    sorting the m values of $C_i$, into increasing order;
    letting j=m−$T_2$×n, wherein $T_2$ is a second target threshold; and
    setting C'=$C_j$, where C' represents the modified committed information rate of traffic.

11. In a telecommunication network having a plurality of interconnected switches, a method of adjusting a committed information rate of traffic for a virtual circuit comprising the steps of:
    a) obtaining statistical data for the plurality of interconnected switches, wherein the statistical data relates to respective amounts of data that pass through the switches;
    b) identifying for each of the plurality of interconnected switches, virtual circuits that make excessive use of the network;
    c) adjusting the committed information rate of traffic to form a modified committed information rate of traffic, wherein a probability model is used to determine the modified committed information rate of traffic, wherein the probability model includes a continuous probability distribution model; and d) computing the modified committed information rate of traffic, C', such that an amount of red traffic is below a target threshold, $T_1$, by solving:

$$\frac{(U-C')^2}{2} = T_1 \frac{U^2 - L^2}{2}$$

with C'>C, wherein L<C, the committed information rate of traffic, and assuming that traffic is uniformly distributed in an interval [L, U] with U<C.

12. A computer-readable medium having computer-executable instructions stored therein for performing steps comprising:
   a) obtaining statistical data for a plurality of interconnected network switches, wherein the statistical data relates to respective amounts of data that pass through the switches;
   b) identifying for each of the plurality of interconnected switches, virtual circuits that make excessive use of the network; and
   c) adjusting a committed information rate of traffic to form a modified committed information rate of traffic, wherein a probability model is used to determine the modified committed information rate of traffic, wherein the probability model includes a discrete probability model;
   d) computing a value for m, which represents a number of samples exceeding a first threshold value $R_1$; and
   e) if $$\frac{m}{n} \geq R_2,$$

wherein n represents a number of samples, then for each sample, $S_i$, having red traffic over the threshold $R_1$, computing a revised capacity $C_i$, such that an estimated amount of red traffic will be below a first target threshold, $T_1$.

13. The computer-readable medium of claim 12, wherein the virtual circuit comprises a permanent virtual circuit.

14. The computer-readable medium of claim 12, wherein step a) includes downloading statistical data found on a website.

15. The computer-readable medium of claim 14, wherein the statistical data found on a website includes a predetermined number of months of the network switch statistics.

16. The computer-readable medium of claim 15, wherein the predetermined number of months comprises three months.

17. The computer-readable medium of claim 12, wherein the statistical data comprises bulkstats.

18. The computer-readable medium of claim 12, containing further computer-executable instructions for performing steps comprising:
   sorting the m values of $C_i$, into increasing order;
   letting j=m−$T_2$×n, wherein $T_2$ is a second target threshold; and
   setting C'=$C_j$, where C' represents the modified committed information rate of traffic.

19. The computer-readable medium of claim 12, wherein the probability model includes a continuous probability distribution model.

20. The computer-readable medium of claim 19, containing further computer-executable instructions for performing steps comprising:
   computing the modified committed information rate of traffic, C', such that an amount of red traffic is below a target threshold, $T_1$, by solving:

$$\frac{(U-C')^2}{2} = T_1 \frac{U^2 - L^2}{2}$$

with C'>C, wherein L<C, the committed information rate of traffic, and assuming that traffic is uniformly distributed in an interval [L, U] with U<C.

21. A computer-readable medium having computer-executable instructions stored therein for performing steps comprising:
   a) obtaining statistical data for a plurality of interconnected network switches;
   b) identifying for each of the plurality of interconnected switches, virtual circuits that make excessive use of the network by performing steps including:
   counting the number of data points i, in n samples that exceed a threshold value $R_1$; and
   if the number of i data points divided by the total number of samples is greater than or equal to $R_2$, adjusting a committed information rate of traffic to form a modified committed information rate of traffic, wherein a probability model is used to determine the modified committed information rate of traffic.

22. The computer-readable medium of claim 21, wherein the probability model includes a discrete probability model.

23. The computer-readable medium of claim 22, containing further computer-executable instructions for performing steps comprising: computing a value for m, which represents a number of samples exceeding a first threshold value $R_1$.

24. The computer-readable medium of claim 23, containing further computer-executable instructions for performing steps comprising: if $$\frac{m}{n} \geq R_2,$$

where n represents a number of samples, then for each sample, $S_i$, having red traffic over the threshold $R_1$, computing a revised capacity $C_i$, such that an estimated amount of red traffic will be below a first target threshold, $T_1$.

25. The computer-readable medium of claim 24, containing further computer-executable instructions for performing steps comprising:
   sorting the m values of $C_i$, into increasing order;
   letting j=m−$T_2$×n, wherein $T_2$ is a second target threshold; and
   setting C'=$C_j$, where C' represents the modified committed information rate of traffic.

26. The computer-readable medium of claim 21, wherein the probability model includes a continuous probability distribution model.

27. The computer-readable medium of claim 26, containing further computer-executable instructions for performing steps comprising:

computing the modified committed information rate of traffic, C', such that an amount of red traffic is below a target threshold, $T_1$, by solving:

$$\frac{(U-C')^2}{2} = T_1 \frac{U^2 - L^2}{2}$$

with C'>C, wherein L<C, the committed information rate of traffic, and assuming that traffic is uniformly distributed in an interval [L, U] with U<C.

* * * * *